United States Patent Office 3,477,971
Patented Nov. 11, 1969

---

3,477,971
RAPID CURING FLUIDIZED BED COATING COMPOSITION HAVING IMPROVED FLEXIBILITY
Roy A. Allen, Iselin, and William L. Lantz, Metuchen, N.J., assignors to Shell Oil Company, New York, N.Y., a corporation of Delaware
No Drawing. Filed Oct. 6, 1966, Ser. No. 584,669
Int. Cl. C08g *30/12;* B44d *1/08*
U.S. Cl. 260—18                     8 Claims

---

ABSTRACT OF THE DISCLOSURE

Rapid-curing fluidizable polyepoxide coating compositions exhibiting improved flexibility and chemical resistance comprises (1) a polyepoxide, (2) a cyclic anhydride (trimellitic anhydride) and (3) a stannous salt of a monocarboxylic acid (stannous octoate).

---

This invention relates to a rapid curing thermosetting resin coating composition. More particularly, this invention relates to a polyepoxide resin composition which is especially suitable for application in electrostatic spray processes, fluidized bed processes and molding compositions.

Specifically, the invention provides a fluidizable polyepoxide coating composition which comprises a polyepoxide having a vic-epoxy equivalency greater than 1.0, a cyclic anhydride containing at least one free carboxyl group not more than 3 carbon atoms removed from the anhydride group, such as trimellitic anhydride, and a stannous salt of a monocarboxylic acid containing at least 5 carbon atoms, preferably a stannous salt of a fatty acid having from 5 to 20 carbon atoms in the molecule.

There is a constant need to develop thermosetting resin coatings which cure relatively fast, i.e., less than a few minutes and preferably less than one minute, while exhibiting the necessary degree of hardness, solvent and chemical resistance and flexibility. Many thermosetting resin compositions are employed today; however, most of them lack to a greater or lesser degree one or more of these desirable properties. A relatively good resin composition having a relatively fast cure is a composition comprising an epoxy resin and a polyfunctional hardener hydrazide such as isophthalyl dihydrazide. Examples of such heat-curable compositions are described in U.S. 2,848,395, issued Aug. 12, 1958. While such compositions possess rapid curing properties, they do not possess the necessary flexibility demanded by some applications. Another good epoxy resin coating composition which has a relatively fast cure and good flexibility utilizes a benzophenone tetracarboxylic dianhydride curing agent. While such compositions do exhibit excellent properties, there is still a distinct need to supply a powdered coating composition which will cure even faster, i.e., less than 30 seconds, while exhibiting good hardness, solvent resistance and flexibility. There is also a need to develop fluidized bed compositions which are less expensive without reducing the desirable properties hereinbefore noted.

It has now been unexpectedly discovered that rapid-curing thermosetting epoxy compositions having excellent flexibility and solvent resistance while curing very rapidly, i.e., less than 60 seconds and generally less than 30 seconds, are obtained when a stannous salt of a monocarboxylic acid, particularly a fatty acid containing from 5 to 20 carbon atoms and more particularly from 6 to 12 carbon atoms in the molecule, is used in combination with trimellitic anhydride and polyepoxides having a vic-epoxy equivalency greater than 1.0.

It is therefore the primary object of the present invention to provide an inexpensive rapid-curing, flexible, chemical-resistant polyepoxide coating composition which is particularly suitable for use in electrostatic spray and fluidized bed processes. This and other objects will become apparent to one skilled in the art from the following detailed disclosure.

When the instant special catalyzed curing system is employed, the speed of cure is measured in seconds rather than minutes. Further, unexpectedly outstanding flexibility and solvent resistance are obtained with the instant curing system. Particularly rapid cures and particularly flexible coatings are obtained when stannous octoate is employed with trimellitic anhydride.

Suitable cyclic anhydrides comprise those compounds having at least one cyclic anhydride group, i.e.,

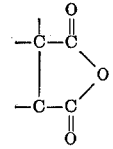

and a free carboxyl group, which is not more than 3 carbon atoms removed from the anhydride group. These anhydride compounds may be aliphatic, cycloaliphatic, or aromatic and may be saturated or unsaturated. Examples of these compounds include, among others, trimellitic anhydride, 1,2,3-(6-methyl-4-cyclohexene)tricarboxylic 1,2-anhydride, 1,2,4-butane tricarboxylic 1,2-anhydride, 1,2,3-pentane tricarboxylic 1,2-anhydride, 1,2,4-hexane tricarboxylic 1,2-anhydride, and 1,2,5-(3-chloroheptane)tricarboxylic 1,2-anhydride. Other examples include the half esters, and amides of pyromellitic anhydride, such as the monobutyl ester:

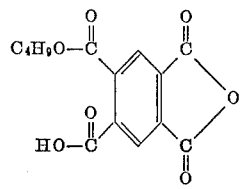

Trimellitic anhydride is particularly preferred because of the outstanding fast-curing, flexibility and solvent resistance obtained therewith.

The polyepoxide materials used in preparing the compositions of the present invention comprise those organic materials which have more than one vic-epoxy group, i.e., more than one

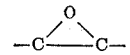

group, which group may be in a terminal position, i.e., a

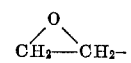

group, or in an internal position, i.e., a

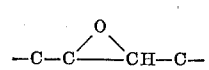

The polyepoxides may be saturated or unsaturated, aliphatic cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-hydroxy-3,4'-epoxybutoxy) diphenyl dimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenols with a halogen-containing epoxide or dihalohydrin in the presence of an alkaline medium. Polyhydric phenols that can be used for this purpose include, among others, resorcinal, catechol, hydroquinone, methyl resorcinol, or polynuclear phenols, such as 2,2-bis(4-hydroxyphenyl)propane (bisphenol A), 2,2-bis(4-hydroxyphenol)butane, 4,4'-dihydroxybenzophenone, bis(4 - hydroxyphenyl)ethane, 2,2 - bis(4 - hydroxyphenyl)pentane and 1,5-dihydroxynaphthalene. The halogen-containing epoxides may be further exemplified by 3-chloro-1,2-epoxybutane, 3-bromo - 1,2 - epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxy-polyethers obtained by reacting, preferably in the presence of an acid-acting compound, such as hydrofluoric acid, or of the afore-described halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)-dimethylmethane and the like.

The preparation of suitable such polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut and dehydrated castor oil, methyl linoleate, butyl linolinate, ethyl 9,12 - octadecadienoate, butyl 9,12,15 - octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl) oxalate, di(2,3-epoxyhexyl)succinate, di(2,3-epoxyoctyl) tetrahydrophthalate, di(4,5-epoxydodecyl)maleate, di(2,3-epoxybutyl)terephthalate, di(2,3-epoxypentyl)-thiodipropionate, di(2,3-epoxybutyl)citrate and di(4,5-epoxyoctadecyl)-malonate, as well as the esters of epoxycyclohexanol and epoxycyclohexylalkanols, such as, for example, di (2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyocta-decanedioate, dioctyl 10,11-diethyl-8,9,12,13-diepoxyeicosanedioate, dicyclohexyl 3,4,5,6-diepoxycyclohexane-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,3-bis(cyclohexenyl)propane, 2,2-bis(cyclohexenyl)butane, 8,10-octadecadiene and the like.

Polyepoxides having an epoxy equivalent weight of between 400 and 4,000 are preferred. Polyepoxides having an average molecular weight above 500, as for example, between about 800 and 1,500 and between about 2,700 and 3,100 are especially preferred. Very suitable polyepoxides are those formed from an epihalohydrin, and particularly epichlorohydrin, and a polyhydric compound, such as 2,2-bis(4-hydroxyphenyl)propane or glycerol.

The polyepoxide which is used in the composition of the present invention may be entirely a solid grade of resin as are the Polyethers D and E, noted above, or may be a blend of resins in which one of them is a liquid grade, such as, a polyepoxide having an epoxy equivalent weight of between 225 and 290 and an average molecule weight of between 450 and 500 as represented by Polyether A. Thus, a suitable mixture of polyepoxides is a mixture containing between 80% by weight of a solid polyepoxide derived from an epihalohydrin and 2,2-bis(4-hydroxyphenyl)propane having an epoxy equivalent weight of between 1,650 and 2,050 and an average molecular weight of between 2,700 and 3,100 (see, for example, U.S. 2,633,458, column 6, line 74 to column 7, line 9) and 20% by weight of a liquid polyepoxide derived from an epihalohydrin and diphenylol propane having an epoxy equivalent weight of between 175 and 210, and an average molecular weight of between 350 and 400 (Polyether A).

The polyepoxide may also be a blend of solid resins, and preferably a blend of a resin having a melting point higher than 90° C. and preferably a resin having a melting point in the range of 100–130° C., the melting point being determined according to Durrans' Mercury Method. Thus, another suitable mixture of polyepoxides is a mixture containing between 30 and 50% by weight of a solid polyepoxide derived from an epihalohydrin and diphenylol propane and having an epoxy equivalent weight of between 1,650 and 2,050, and a melting point of between 120 and 160° C. and between 50 and 70% by weight of a solid polyepoxide derived from an epihalohydrin and diphenylol propane having an epoxy equivalent weight between 450 and 525, and a melting point between 60 and 80° C. (Polyether D).

Stannous salts which are especially siutable for catalyzing the present compositions are the stannous salts of monocarboxylic acids having at least 5 carbon atoms, preferably fatty acids containing from about 5 to about 20 carbon atoms and more preferably from about 6 to 12 carbon atoms. Suitable stannous salts include, among others, stannous caproate, stannous octoate, stannous laurate, stannous palmate, stannous stearate, stannous oleate, and stannous naphthenate. Stannous octoate is particularly preferred because it promotes exceptionally rapid cures and imparts outstanding flexibility as well as high impact strength and solvent resistance to the cured films and molding compositions. The stannous salt catalyst is beneficially employed in concentrations from 0.1 to 5 parts per one hundred parts of polyepoxide and preferably from about 0.5 to 3 parts per one hundred parts of polyepoxide.

Suitable fillers which may be employed as desired, include, among many others, aluminum powder, mica, bentonites, clays, synthetic resins and elastomers, ignited $Al_2O_3$, short-fiber asbestos, wood flours, barytes, carbon black, silica, zinc dust, talc and the like. A large number of fillers are available commercially in particle sizes from about 0.1 micron upward.

The quantity of fillers used is dependent upon many factors such as, cost, particle size, particle shape, absorption characteristics and loading volume. The light weight fillers such as asbestos and uncompressed mica are employed in ratios below 50 phr. (parts per one hundred parts of polyepoxide) and generally beow 35 phr.; the medium weight fillers, such as talc and powedered aluminum, may be employed up to about 50 phr.; and the heavier fillers may be employed up to about 100 phr. In general, however, in order to optimize raw material costs without minimizing coating properties, the ratio of filler to polyepoxide ranged from about 10 to about 60 phr.

It is generally desirable, although not necessary, to employ a thixotroping agent to prevent dripping or sagging at high film build. Any of the thixotroping agents normally used in the art are siutable for use in the present compositions, including silica aerogels, bentonite clays and their derivatives, castor oil derivatives and the like.

The proportions of the polyepoxide, cyclic anhydride curing agent, fillers, catalysts, thixotroping agents and other additives will vary within wide ranges; however, rapid cure and excellent film flexibility is achieved when the final composition comprises from about 50 to 80 parts by weight of polyepoxide and from about 5 to 20 parts by weight of trimellitic anhydride; from about 0.1 to 5 parts per one-hundred parts of polyepoxide of a stannous salt of a monocarboxylic acid; and, optionally, from about 5 to 30 parts by weight of filler.

Expressed another way, on a chemical equivalent weight basis, approximately 0.75 to 1.50 equivalents of trimellitic anhydride is employed per equivalent of polyepoxide.

A particularly good composition possessing outstanding flexibility and solvent resistance when cured in 30 seconds or less at a temperature range of 450–500° F. comprises from about 65 to 75 parts by weight of a glycidyl polyether of 2,2-bis(4-hydroxyphenyl)propane having a molecular weight of from about 900 to 1,500, an epoxide value of about 0.10 to about 0.20 eq./100 g., and a hydroxyl value of about 0.32 to 0.35 eq./100 g., from about 8 to 15 parts by weight of trimellitic anhydride and from about 0.5 to 2.0 parts by weight of stannous octoate. No appreciable degradation in coating properties are observed when from about 5 to 30 parts by weight of a filler is add:d to this composition.

Another particularly good composition having excellent flexibility and rapid curing properties is obtained when the polyepoxide in the above composition is a glycidyl polyether of 2,2-bis(4-hydroxyphenyl)propane having an expoxy value of about 0.05 eq./100 g., a molecular weight of about 2,900 and a melting point of from about 127–133° C. by Durrans' Mercury Method.

The coating compositions of the present invention can be prepared as powders or in solution. When powders are desired, they can be prepared by both dry blending and fusion blending techniques, although dry blending techniques are preferred.

Mixtures of Cellosolve acetate and toluene have been found suitable for preparing these coatings from solution.

In general, the average particle size of the powders may range from rather samll particle sizes of, say 5 microns or even smaller to 600 microns or greater. An especially preferred range is between 50 and 175 micons. A very suitable fluidizable composition was prepared by micropulverizing the blended components to pass through 100 mesh size screen (147 microns).

Any of the conventional fluidized bed processes may be employed wherein the compositions are maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C., before it is dipped into the fluidized bed. If an article is to be completely coated it should of course be completely immersed in the fluidized bed. The article is preferably moved backwards and forwards in the bed, over a period of time determined by the desired thickness of coating. For the production of thin coatings, i.e., less than 0.015 inch thick, the period during which an article is dipped or immersed into the bed is usually less than 3 seconds.

After the article has been in contact with the fluidized bed for the desired time, it is removed, excess powder adhering to the article is preferably removed, and the coating cured by heating to at least 125° C., preferably between 150 and 250° C.

The compositions of the instant invention may also be sprayed as by a compressed air spray gun or electrostatically, i.e., by maintaining a difference in electrostatic change between the particles and the article to be coated.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

The test procedures employed in the following examples were as follows:

The film flow, film continuity and film appearance were evaluated visually. The film continuity was further evaluated with a Bird Dog Holiday Detector, a highly sensitive, wet sponge device for locating defects in protective coatings. A maximum of 30.0 volts was applied to the coated surface.

The solvent resistance was determined by immersing the coated article in the particular solvent. The time was then recorded when the surface coating could be scratched with the fingernail.

To evaluate the flexibility, a solvent cleaned, 1½" x 6" 20 gauge, cold rolled steel panel is heated to 450–470° F. on a carefully controlled hot plate. The temperature of the panel is checked with a surface pyrometer. A 6–9 mil. film of coating is sprayed onto the panel, which is then allowed to remain on the hot plate for 23–30 seconds. The panel is then quickly removed from the hot plate and quenched in cold running water. The coated panel is wiped dry, allowed to come to equilibrium for a period of 20 minutes, and then slowly bent over a one inch diameter mandrel. The angle at which the first crack appears is recorded as a measure of flexibility.

The gel times were determined using a "Cure Plate" with a range of 350° F. to 480° F. manufactured by Thermo Electric Company, Cleveland, Ohio. The cure plate was adjusted to maintain the desired temperature. A small quantity (approximately 1 cc. by volume) of powder was placed on the surface of the cure plate. The melted powder was agitated at a moderate rate with a tongue depressor until gelation occurred. The gel time is the number of seconds from the time the powder comes into contact with the cure plate until gelation begins.

EXAMPLE I

This example illustrates the preparation of the present fluidizable polyepoxide compositions as well as their superiority over a conventional fast-cure powdered epoxy system.

A rapid curing flexible composition was prepared by dry blending the following components:

|  | Percent (wt.) |
|---|---|
| Polyepoxide (a glycidyl polyether of 2,2-bis(4-hydroxyphenyl)propane having a melting point of 98° C., a molecular weight of 1,400 and an epoxide equivalent weight of 950) | 67.2 |
| Trimellitic anhydride | 11.3 |
| Stannous octoate | 1.3 |
| Titanium dioxide | 1.0 |
| Molybdate orange | 1.5 |
| Filler (Silica 219, fine silica sand manufactured by Whittaker, Clark and Daniels, Inc.) | 17.5 |
| Defoamer (PC-1344, manufactured by Monsanto Chemical Co., 60% in xylene) | 0.2 |

The equivalent weight of trimellitic anhydride is 128 (192/1.5) and the equivalent weight of the polyepoxide is 950, therefore, it will be appreciated that on a stoichiometric basis, there is a 25% excess of trimellitic anhydride. Also, the amount of stannous octoate employed is 2.0 parts per hundred parts of polyepoxide (phr.).

800 grams of the total dry ingredients were loaded into a 1½ gallon pebble mill containing 5,500 grams of grinding media. After grinding for 20 hours, the powdered coating was electrostatically sprayed on 1½" x 6" steel panels and cured for 30 seconds at 450° F. The film thickness ranged from 6 to 9 mils.

The procedure was essentially repeated wherein the novel polyepoxide coating composition of the present invention was replaced with a commercially available proprietary rapid-curing hydrazide-epoxy system.

The comparative results are tabulated below:

| Composition | Solvent Resistance (MIBK), minutes | Flexibility (Degrees) |
|---|---|---|
| Polyepoxide, trimellitic anhydride, stannous octoate composition | >60 | >180 |
| A proprietary hydrazide-epoxy composition | 30 | 10 |

EXAMPLE II

The polyepoxide-trimellitic anhydride-stannous octoate composition prepared by the procedure of Example I was further evaluated as follows:

Coated steel panels were immersed in 10% nitric acid, 50% sulfuric acid, 37% hydrochloric acid, 25% acetic acid, saturated sodium hydroxide, xylene, carbon tetrachloride, mineral spirits and methyl isobutyl ketone. In every instance, the films were unaffected after a 6-month immersion.

The extent of agglomeration was determined by running a sieve analysis and then determining the gel times for each retained sample. The results are tabulated as follows:

| | Sieve Size | | | | | |
|---|---|---|---|---|---|---|
| | No. 50 | No. 80 | No. 100 | No. 200 | No. 325 | Pan |
| Percent retained | 0.8 | 1.6 | 2.8 | 11.7 | 29.0 | 54.0 |
| Gel times | 4.6 | 4.7 | 4.6 | 4.6 | 4.6 | 4.6 |

It will be noted that the gel times were substantially identical; therefore, the powder is agglomerated.

The powdered composition also exhibited excellent stability. After a six-month storage at room temperature (77° F.), the gel time remained a constant 4.6.

EXAMPLE III

The procedure of Example I was substantially repeated wherein the pigment level was varied. A 25% stoichiometric excess of trimellitic anhydride and 2 phr. stannous octoate were employed.

The results are tabulated below:

| Properties: | | | |
|---|---|---|---|
| Pigment Level (percent) | 20 | 30 | 35 |
| Gel Time at 450° F. (Sec.) | 4.8 | 4.6 | 4.7 |
| MEK Resistance (min.) Cure: | | | |
| 30 sec. at 450° F.[a] | 2–3 | 2–3 | 2–3 |
| MIBK Resistance (min.) Cure: | | | |
| 30 sec. at 450° F.[a] | >60 | >60 | >60 |
| Film Appearance | Excellent | Excellent | Excellent |
| Barcol Hardness | 42 | 49 | 50 |
| Flexibility, degrees:[b] | | | |
| 1" Mandrel | >180 | >180 | >180 |
| ⅛" Mandrel | >180 | >180 | >180 |
| Flexibility, degrees (1" Mandrel) Cure: | | | |
| 23 sec. at 500° F. | >180 | >180 | >180 |
| 23 sec. at 475° F. | >180 | >180 | >180 |
| 23 sec. at 450° F. | >180 | >180 | >180 |

[a] Run on dipped steel probes.
[b] Run on electrostatically sprayed 1½" x 6" steel panels cured one minute at 450° F. Film thickness six-nine mils.

EXAMPLE IV

The procedures of Examples I and III were substantially repeated wherein equivalent amounts of stannous caproate, stannous laurate, stannous oleate and stannous naphthenate were employed in lieu of stannous octoate. Related improved results were obtained.

EXAMPLE V

The procedure of Example I is essentially repeated wherein an equivalent amount of 1,2,4-butane-tricarboxylic 1,2-anhydride is substituted for trimellitic anhydride. Similar results are obtained.

We claim as our invention:

1. A rapid-curing fluidizable polyepoxide coating composition having improved flexibility and chemical resistance which comprises (1) a polyepoxide having a vic-epoxy equivalency greater than 1.0 selected from the group consisting of glycidyl polyethers of 2,2-bis(4-hydroxyphenyl)propane and glycidyl polyethers of polyhydric aliphatic alcohols containing from 2 to 10 carbon atoms and having from 2 to 6 hydroxyl groups, (2) a cyclic anhydride containing at least one free carboxyl group not more than 3 carbon atoms removed from the anhydride group, and (3) a stannous salt of a monocarboxylic acid.

2. A fluidizable polyepoxide coating composition as in claim 1 wherein the stannous salt is a salt of a fatty acid containing from 5 to 20 carbon atoms in the molecule.

3. A fluidizable polyepoxide coating composition as in claim 1 wherein the stannous salt is stannous octoate and the particles have a size between 50 and 175 microns.

4. A fluidizable polyepoxide coating composition as in claim 1 which additionally comprises from 10 to 60 parts of filler per 100 parts of polyepoxide.

5. A fluidizable polyepoxide coating composition possessing fast-cure properties which comprises from 50 to 80 parts by weight of a glycidyl polyether of 2,2-bis(4-hydroxyphenyl)propane, from 5 to 20 parts by weight of trimellitic anhydride and from 0.5 to 5 parts of stannous octoate per one hundred parts of the glycidyl polyether.

6. A fluidizable polyepoxide coating composition as in claim 5 which comprises from 65 to 75 parts by weight of a glycidyl polyether of 2,2-bis(4-hydroxyphenyl)propane having a molecular weight of from 900 to 1,500 and an epoxide value of from 0.10 to 0.20 eq./100 g., from 8 to 15 parts by weight of trimellitic anhydride and from 0.5 to 2.0 parts by weight of stannous octoate.

7. A fluidizable polyepoxide coating composition as in claim 5 wherein the glycidyl polyether of 2,2-bis(4-hydroxyphenyl)propane has a molecular weight of 2,700 to 3,100 and an epoxide value of about 0.05 eq./100 g.

8. A fluidizable polyepoxide coating composition as in claim 5 which additionally comprises from 5 to 30 parts by weight of filler.

References Cited

UNITED STATES PATENTS

| | | | |
|---|---|---|---|
| 3,388,185 | 6/1968 | Goldberg et al. | 260—830 |
| 3,269,975 | 8/1966 | Lee | 260—47 X |
| 3,362,922 | 1/1968 | Manasia et al. | 260—18 |
| 3,344,096 | 9/1967 | Manasia et al. | 260—78.4 X |
| 3,336,251 | 8/1967 | Manasia et al. | 260—18 |
| 3,269,974 | 8/1966 | Childs | 260—37 |
| 3,201,360 | 8/1965 | Proops | 260—18 |
| 3,028,251 | 4/1962 | Nagel | 260—37 X |
| 2,997,776 | 8/1961 | Matter et al. | 260—37 X |

DONALD E. CZAJA, Primary Examiner
C. WARREN IVY, Assistant Examiner

U.S. Cl. X.R.

117—17, 21; 260—2, 37, 47, 75, 78.4, 830